May 29, 1923.
C. R. NICHOLS
1,457,185
MACHINE AND PROCESS FOR MANUFACTURING ARTICLES FROM PLASTIC MATERIALS
Filed April 5, 1923
5 Sheets-Sheet 4
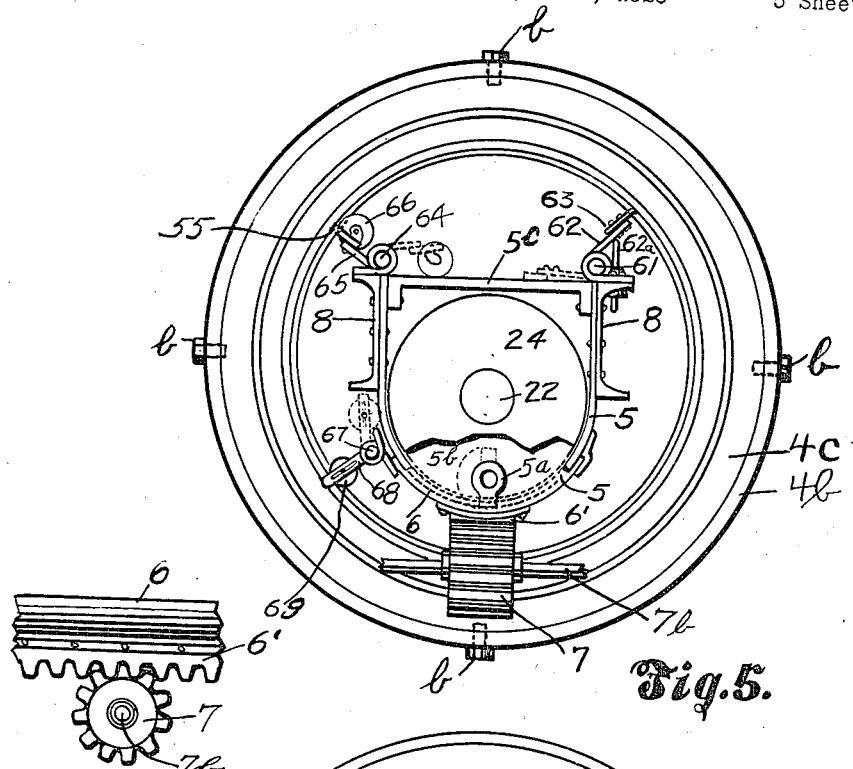
Fig.5.
Fig.7.
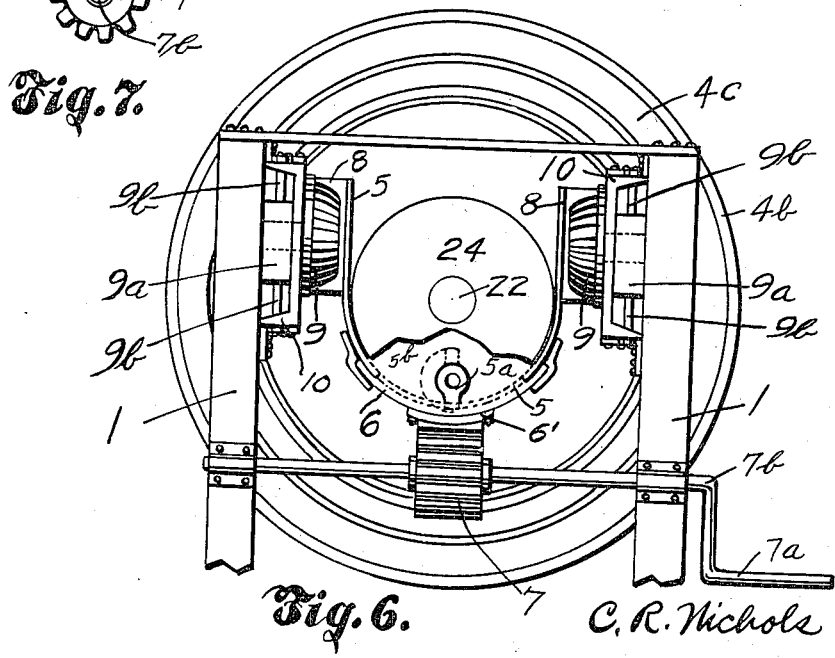
Fig.6.
C. R. Nichols, Inventor
By John M. Spellman
Attorney May 29, 1923.

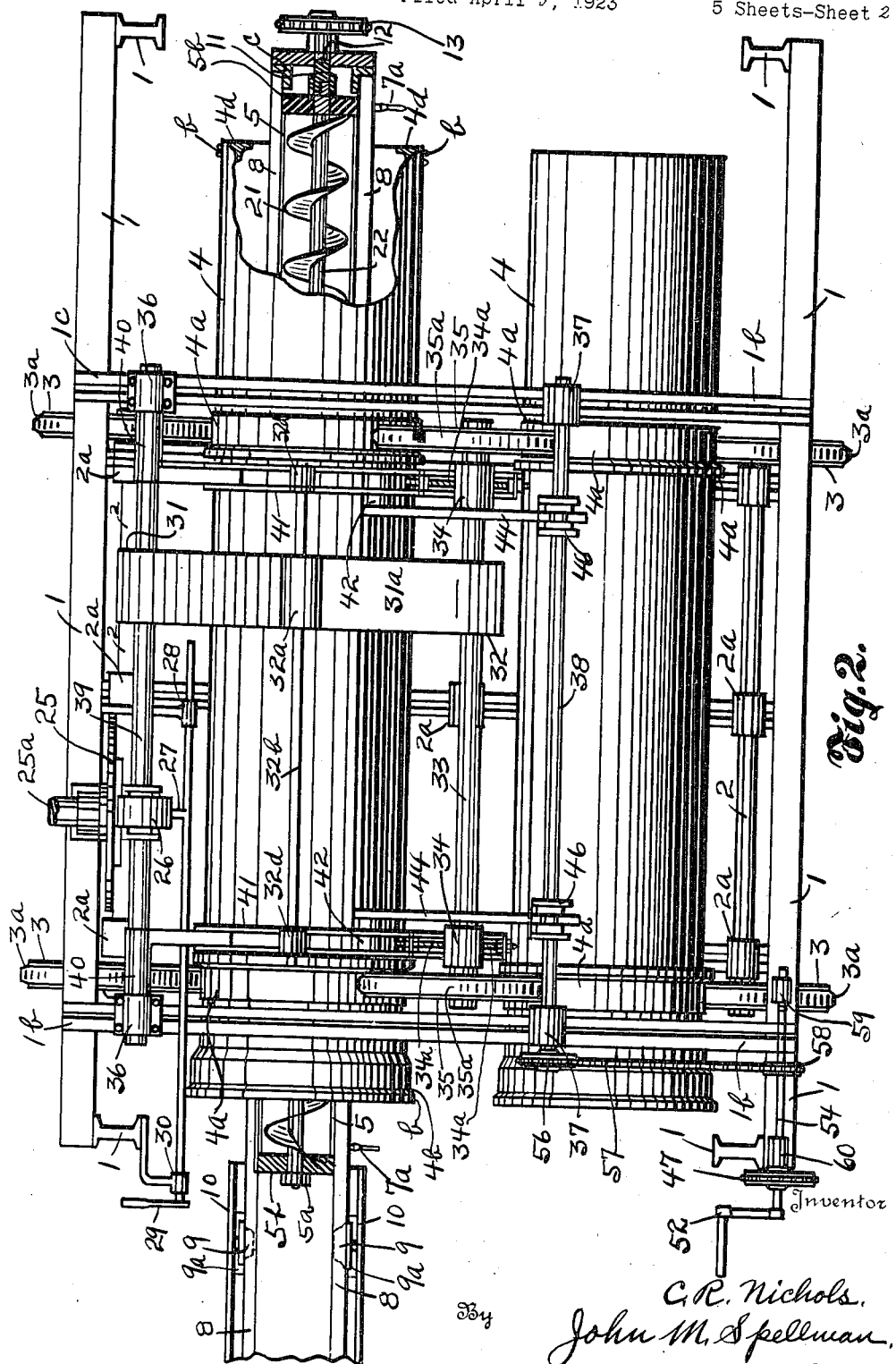

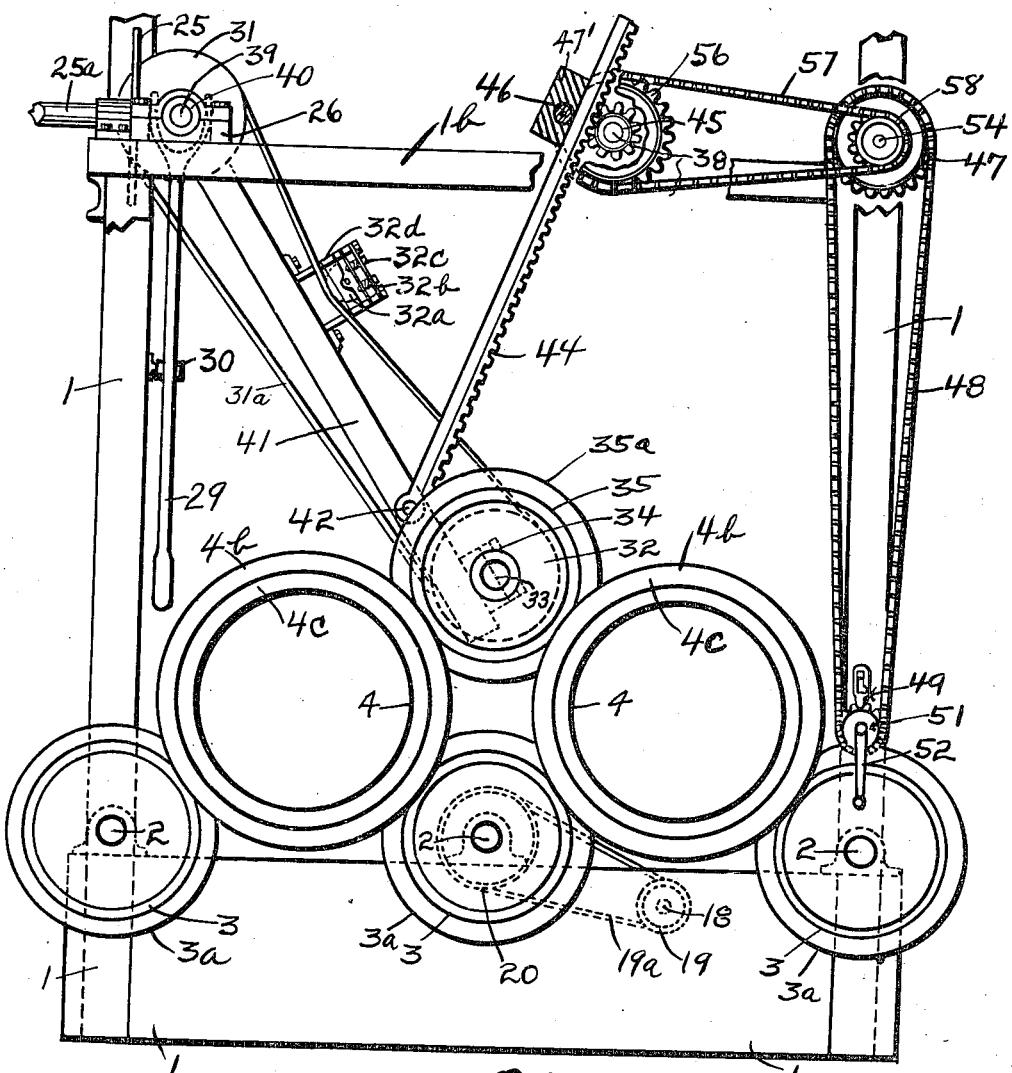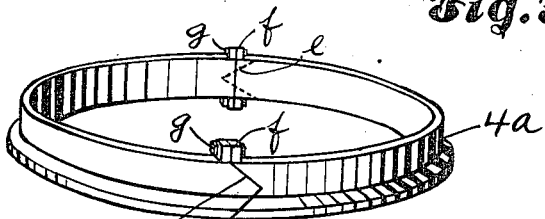

C. R. NICHOLS 1,457,185

MACHINE AND PROCESS FOR MANUFACTURING ARTICLES FROM PLASTIC MATERIALS

Filed April 5, 1923.   5 Sheets-Sheet 5

C. R. Nichols INVENTOR.

BY John M. Spellman
ATTORNEYS.

Patented May 29, 1923.

1,457,185

UNITED STATES PATENT OFFICE.

CLIFFORD R. NICHOLS, OF DALLAS, TEXAS.

MACHINE AND PROCESS FOR MANUFACTURING ARTICLES FROM PLASTIC MATERIALS.

Application filed April 5, 1923. Serial No. 630,113.

*To all whom it may concern:*

Be it known that I, CLIFFORD R. NICHOLS, a citizen of the United States, residing at Dallas, in the county of Dallas and State of Texas, have invented certain new and useful Improvements in Machines and Processes for Manufacturing Articles from Plastic Materials, of which the following is a specification.
This invention relates to an apparatus and process for making various articles, such as pipes and conduits from plastic material, as for example cement mortar, concrete and other cementitious agglomerates.
The primary object of the invention is to provide for economical manufacture or production of articles possessed of superior strength, smooth formation and of uniform thickness.
A further object of the invention is the production of the articles by the use of centrifugal force and the provision of means to allow of a wide range of the speed of rotation of the form to effect corresponding centrifugal action.

The invention also aims to provide novel means for feeding the material in a semi-dry state of consistency into the forms, and to further utilize the feeding means to carry-off surplus water and deleterious matter upon completion of the forming operation, the feeding means also acting to support the evening and polishing means for the inner circumference of the article being formed or molded.

Still further the invention aims to provide means for curing the product and for permitting the easy removal of the latter.

The invention has still further and other objects which will be later set forth and manifested in the course of the following description.

Figure 2, is a top plan view of the invention, with portions cut away to show the construction;

Figure 3, is an end view, showing the arrangement of the elements and the mechanism controlling the power transmission;

Figure 4, is a detail perspective view of the form runner rim;

Figure 5 is an end view of the form, showing the feeding and finishing mechanism therein;

Figure 6, is a like view, showing the means for slidably supporting the trough;

Figure 7, is a detail view of the rack and pinion means for operating the closing means of the feeder mechanism;

Figure 1:
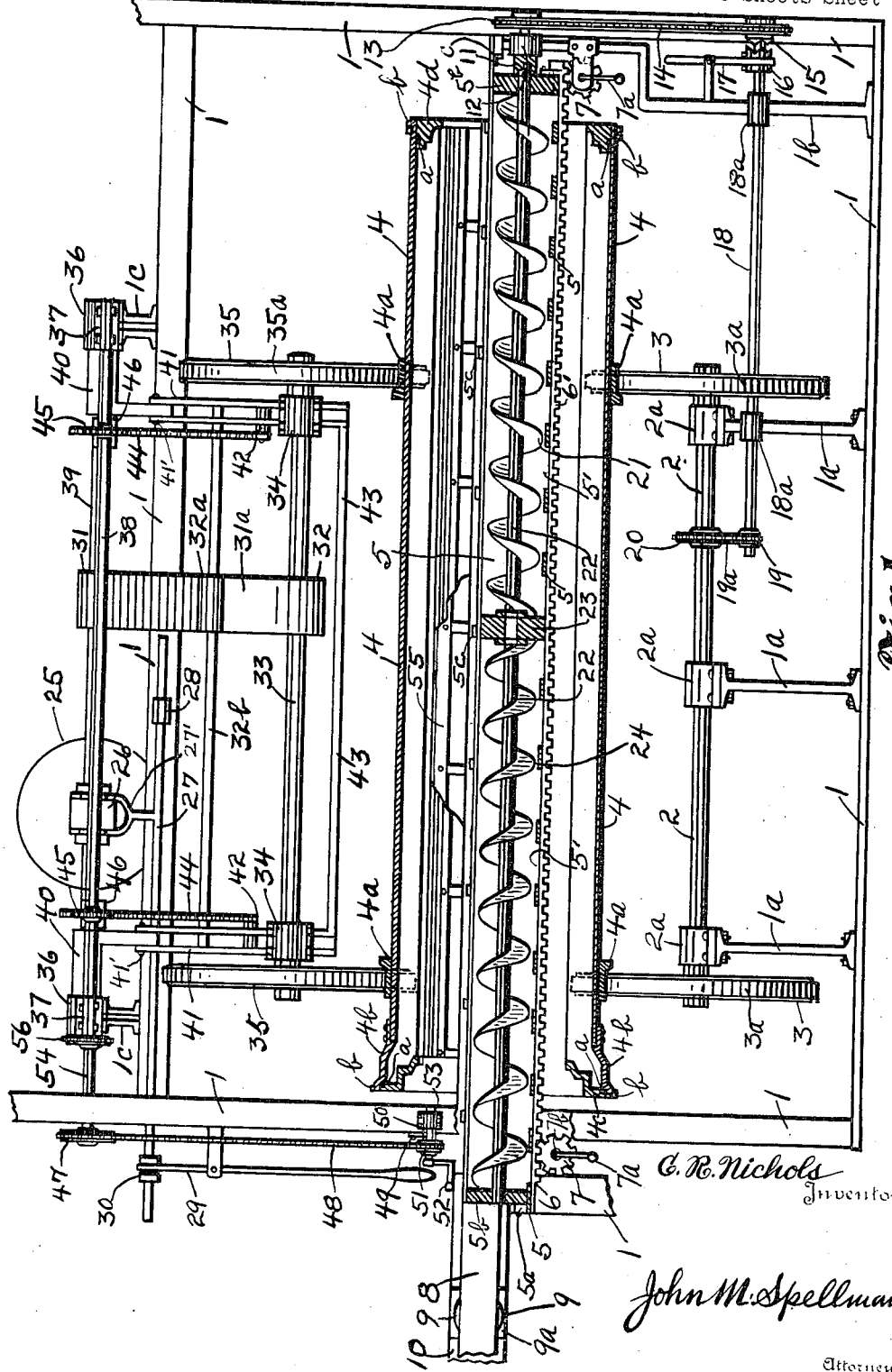
Figure 1 is a side view of the invention, partly in section and partly broken away;

In proceeding in accordance with the present invention, a frame 1 is employed having vertical standards $1^a$ supporting idler shafts 2, in bearings $2^a$. Wheels 3 are carried by the shafts 2 and are equipped with preferably rubber-composition treads $3^a$, the treads engaging flanged runners $4^a$ carried by the mold forms 4. As shown in Figure 3, the shafts 2 with sets of wheels 3 are employed, the wheels supporting a pair of mold forms 4.

One end of each form has a flared extension $4^b$ to which an end ring $4^c$ is secured, the opposite ends of the forms having end rings $4^d$, the several rings being attached by bolts $b$ and have gaskets $a$ to form watertight connections with the forms.

A trough 5 is disposed in each form, the bottoms of which are formed with apertures 5', controlled by a slidable bottom 6, the latter having a rack 6'. Rack 6' is engaged by pinions 7 rotated manually by cranks $7^a$.

The troughs have ends $5^b$ and a central partition 23, in which ends and partitions a shaft 22 is journaled, the latter carrying screw feed or worms 21 and 24. Dogs or latches $5^a$ are carried by the trough ends $5^b$ and are pivoted to engage with and be disengaged from the bottoms 6. When engaged with the bottoms 6 the latter and therewith the troughs and the feeding screws therein, are caused to be moved into or out of the forms, upon rotation of the shafts $7^b$ by means of cranks $7^a$ and their pinions 7, and upon release of the dogs and rotation of the cranks $7^a$, the bottoms 6 only will be moved.

The sides of the troughs have channel bars 8 fastened thereto, (Figures 1 and 5) which slide on rollers 9 in housings $9^a$, the rollers 9 being adjustable on pins $9^b$ in channel bars 10, the latter carried by the frame 1.

A shaft 11 has one jaw of a clutch 12 thereon, the other jaw being affixed to screw feed shaft 22 one jaw of the clutch being connected to a sprocket 13, the latter driven by chain 14 from a sprocket controlled by a clutch jaw 15. A clutch jaw 16 complementary to jaw 15, is manually controlled by lever 17. The clutch jaw 16 is affixed to a shaft 18 mounted in bearings 18$^a$. The shaft 11 is journaled in a vertical standard 1$^b$, as is also one end of shaft 18 (Figure 1). A sprocket 19 at the opposite end of shaft 18 drives a chain 19$^a$, the latter engaged over sprocket 20 mounted on shaft 2.

As shown in Figures 2 and 3 of the drawings, a planetary gear drive 25—26 is employed power being applied to disk 25 mounted on a drive shaft 25$^a$, the driven roller 26 being slidably keyed onto a power shaft 39 mounted in bearings 40. A shaft 27 slidable in bearings 28 has a fork 27' to slidably adjust roller 26, a hand lever 29 having a yoke engaging collar 30 on shaft 27 being employed to operate the latter. The shaft 39 has a pulley 31 thereon, over which a belt 31$^a$ is trained, the belt also being engaged over a pulley 32 on a shaft 33. A belt tensioning device is employed including a pressure roller 32$^a$ mounted on a shaft 32$^b$ in housing 32$^d$, spring means 32$^c$ being employed to effect constant tension on the belt.

Shaft 33 is mounted in adjustable bearings 34, the latter adjusted by screw bolts 34$^a$ (Figure 2) the shaft carrying driving wheels 35 at its ends, which latter engage the runners 4$^a$ of the forms 4 and drive the latter, the wheels 35 being equipped with treads or tires 35$^a$.

The bearings 40 are housed in boxings 36 attached to channel bars 1$^c$ and as shown in Figure 1 of the drawing are of L-shape, having the arms 41 of a substantially U-shaped frame 43 pivotally secured at 41' thereto. The bearings 34 of shaft 33 are carried by the arm 41 of the frame 43 as shown in Figures 1 and 3 of the drawings. The housings 32$^d$ of the shaft 32 of the belt tensioning device as shown in Figure 3 are carried by the arms 41 of the frame 43, as shown in Figure 2.

Racks 44 are pivoted on pins 42 carried by the arms 41 of the frame 43 and are engaged by pinions 45 mounted on a shaft 38, the racks being held in engagement with the pinions by rollers 46 mounted in housings 47' carried by shaft 38, the latter shaft being mounted in bearings 37 carried by the channel bars 1$^c$.

In order to operate the racks 44 to raise or lower the driving wheels 35 and to also control the degree of pressure of the latter on the runners 4$^a$ of the form 4, a sprocket 56 is mounted on shaft 38 and is driven by a chain 57 engaged about a sprocket 58 on shaft 54, the latter shaft bearing a second sprocket 47 operated by a chain 48, the latter driven from a sprocket 51. A sprocket 51 is operated manually by a crank 52, a dog or pawl 49 being provided to hold the sprocket 51 against turning.

The runners 4$^a$ for the forms are shown in detail in Figure 4, being preferably of semi-circular form connected by lugs $f$ and bolts $g$ and having V-shaped joints indicated at $e$.

The operation is as follows.

The inner walls of the forms are first coated with any waxy substance, such as a preparation of paraffin.

Power being applied to the shaft 39 is communicated through belt 31$^a$ to the driving wheels 35, and since the latter engages the runners 4$^a$ of the adjacent forms 4, the latter will be rotated. The rotation of the forms 4, is transmitted to the wheels 3, the latter rotating the shaft 18 through the chain 19$^a$. Upon movement of the control lever 17 the clutch jaws 15 and 16 will be engaged to thereby effect driving of the chain 14 and therethrough the feed screws 21 and 24. The plastic material is fed into either or both ends of the trough, and is carried by the feed screws 21 and 24 throughout the length of the trough. Upon release of the dog 5$^a$ as shown in Figure 6, the bottom 6 of the trough is moved by the crank 7$^a$ to uncover the openings 5' and to permit the plastic material to flow into the form. The material is spread uniformly in the form by a straight edge 55, the latter as shown in Figure 5 being mounted on hinges 65 connected to a rod 64, the latter attached to the trough. Guide wheels 66 are carried by the hinges 65 and travel against the end members 4$^c$ and 4$^d$. When the required amount of material is fed into the form and the evening device has smoothed the surface thereof during slow rotation of the form, the speed of rotation of the form is increased, and setting of the material attained by centrifugal force. The water and deleterious substances will be engaged by the scraper 63, the latter mounted on hinges 62 carried by rod 61 supported on the trough. Adjustable pins 62$^a$ engage the hinges 62 and hold the scraper 63 in any desired relation, as illustrated in Figure 5, the pin 62$^a$ passing through the channel bars 8 affixed to the sides of the trough 5. The water is thus deflected by the scraper 63 into the trough and is moved by the screws 21 and 24 out of the latter, it being understood that prior to the removal of the water the bottom 6 is moved to close the openings 5. After the water has been extracted, a glass polishing roller 69 shown in Figure 5 is moved to a position to engage against the inner circumference of the article being molded, the roller 69 being carried by hinges 68 mounted on a rod 67. As shown in Figure 5 the roller 69 is responsive to the action of gravity and has its trunnions mounted in slots in the hinges 68, so that the roller exerts pressure, under the impulse of gravity to polish the interior of the article being molded.

Figure 8:
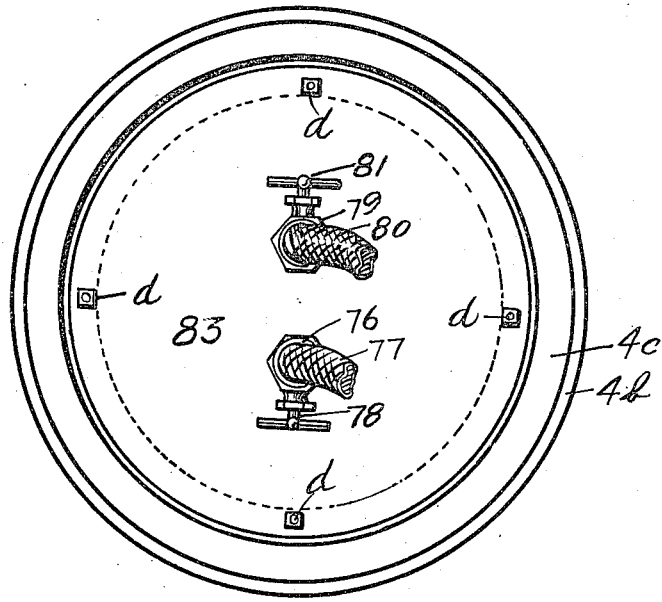
Figure 8, is an end view of the form with the curing attachment fastened thereto.
Figure 9:
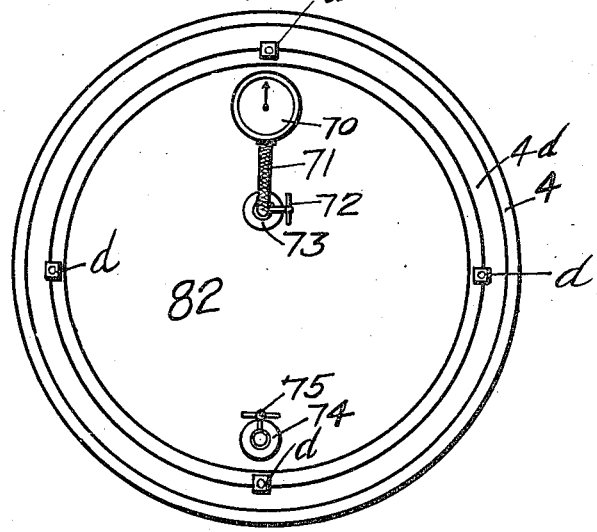
Figure 9, is a like view of the opposite end of the form with the curing attachment thereon.

After the polishing operation has been completed the dog 5ª is moved downwardly, and the hand crank 7ª rotated to remove the trough and feeding mechanism from the form and the product contained in the latter. The bulk heads 83 and 82, shown in Figures 8 and 9 are now bolted at d in position on the ends of the form. The form 83 has valves 76 and 79 provided with handles 78 and 81 and with hose connections 77 and 80, the hose 80 being connected to a source of water supply and the hose 77 to a source of steam supply. The bulk head 82 has a heat and pressure gage 70 controlled by valve 72 and connected by pipe 71 to nipple 73, and further has an outlet 74 controlled by valve 75. The steam and water are used and cure the product. The paraffin or wax coating applied to the forms, is liquefied by the heat of the steam so that the product or ware may be easily removed.

When the trough is moved into the form, it will be seen that the jaws of the clutch 12 (Figure 1) will be operatively engaged so that upon rotation of the apparatus the feed screws 21 and 24 will be operated, and that upon movement of the trough out of the form, the clutch jaws will be automatically disengaged.

When the trough is slid out of the form, it will be seen that same will be engaged and supported by the channel bars 10.

While this invention relates more specifically to articles made of reinforced or unreinforced concrete, and to pipes and conduits, it is readily understood that it is adapted to the molding and forming of any hollow article by the changing of the forms to the exterior shape required of the article to be made. Also the use of a variety of plastic materials, such as clays, plaster of Paris and in fact any suitable plastic is contemplated.

What is claimed is:—

1. In a centrifugal plastic ware making machine, a cylindrical mold, means to rotate the mold, a trough, a movable bottom for the trough, material feeding means in the trough, means to operate the material feeding means, means to actuate the trough bottom to permit the material in the trough to enter the mold, and means to support the trough upon movement thereof out of the mold.

2. In a centrifugal plastic ware making machine, a cylindrical mold, means to rotate the mold, a trough, a movable bottom for the trough, material feeding means in the trough, means to operate the material feeding means, means to actuate the trough bottom to permit the material in the trough to enter the mold, means to support the trough upon movement thereof out of the mold, and means to latch the trough bottom to the trough so as to cause movement of the trough bottom with the trough.

3. In a centrifugal plastic ware making machine, a cylindrical mold, means to rotate the mold, a trough, a movable bottom for the trough, material feeding means in the trough, means to operate the material feeding means, means to actuate the trough bottom to permit the material in the trough to enter the mold, means to support the trough upon movement thereof out of the mold, and means actuated by the cylinder to actuate the operating means of the material feeding means.

4. In a centrifugal plastic ware making machine, a cylindrical mold, means to rotate the mold, a trough, a movable bottom for the trough, material feeding means in the trough, means to operate the material feeding means, means to actuate the trough bottom to permit the material in the trough to enter the mold, means to support the trough upon movement thereof out of the mold, and means for coupling and uncoupling the operating means of the material feeding means to and from the latter upon movement of the trough into and out of the form.

5. In a centrifugal plastic ware making machine, a mold, means to rotate the mold, a trough, material feeding means in the trough, driving means for the feeding means, means to move the trough into and out of the mold, and means for connecting and disconnecting the feeding means from said driving means by and upon mere movement of the trough into and out of the mold.

6. In a centrifugal plastic ware making machine, a pair of spaced rotary molds, a series of rotary members supporting the molds, driving means for the molds including a rotary driving member engaged with the upper arcs of the molds and disposed to aline with the space between the molds, and means to exert and regulate downward pressure of the driving member upon the molds.

7. In a centrifugal plastic ware making machine, a pair of spaced rotary molds, a series of rotary members supporting the molds, driving means for the molds including a rotary driving member engaged with the upper arcs of the molds and disposed to aline with the space between the molds, means to swingingly mount said driving member, and adjustable means connected to said mounting means of the driving member to regulate the pressure of the driving member upon the molds.

8. In a centrifugal plastic ware making machine, a pair of spaced rotary molds, a series of rotary members supporting the molds, driving means for the molds including a rotary driving member engaged with the upper arcs of the molds and disposed to aline with the space between the molds, a pivoted frame carrying said driving member, a rack bar pivoted to the frame, a pinion engaged with the rack bar, and means to rotate the pinion.

9. In a plastic ware making machine, a mold, heads for detachable connection with the ends of the mold, connections carried by one head for admitting steam and water into the mold, and an outlet for the steam and water carried by the other head.

10. In a centrifugal plastic ware making machine, a pair of cylindrical molds arranged side by side, means to rotatably support the molds, and driving means for the molds including a driving member common to and engaging the upper inner arcs of each of the molds.

11. In a centrifugal plastic ware making machine, a pair of cylindrical molds arranged side by side, means to rotatably support the molds, driving means for the molds including a driving member common to and engaging the upper inner arcs of each of the molds, and means to mount the driving member for movement into and out of engagement with the molds.

12. In a centrifugal plastic ware making machine, a pair of cylindrical molds arranged side by side, means to rotatably support the molds, driving means for the molds including a driving member common to and engaging the upper inner arcs of each of the molds, and means to mount the driving member to enable regulation of the degree of pressure exerted thereby upon the molds.

13. In a centrifugal plastic ware making machine, a rotary mold, means to rotate the mold, rotary means supporting the mold and rotated thereby, means to distribute the material along the length of the mold, and means actuated by said rotary supporting means for actuating the distributing means.

14. In a centrifugal plastic ware making machine, a rotary mold, means to rotate the mold, rotary means supporting the mold and rotated thereby, means to distribute the material along the length of the mold, means actuated by said rotary supporting means for actuating the distributing means, means to mount the distributing means for movement into and out of the mold, and means to automatically connect and disconnect the distributing means from said actuating means thereof upon movement of the distributing means into and out of the mold.

15. In a centrifugal plastic ware making machine, a rotary mold, a trough having a discharge extending throughout substantially its length to discharge material into the mold throughout substantially the length of the mold, means to move the trough into and out of the mold, means in the trough to feed the material through the discharge and means controlling the discharge to open and close the latter whereby to allow the material to be discharged and to enable the mold to collect water resultant from the molding.

16. In a plastic ware making apparatus, a mold, a trough, mounting means for the trough to allow same to be moved into and out of the mold, a bottom for the trough movable to permit the material in the trough to enter the mold, means to actuate the trough bottom, and means to selectively connect the trough and bottom so that upon movement of the bottom the trough will be moved therewith.

17. In a plastic ware making apparatus, a mold, combined water collecting and material supplying means in the mold having an open top and having a discharge below the top, means to effect discharge of material from the said means into the mold and for closing the first named means against discharge to enable same to collect water.

18. In a centrifugal plastic ware making machine, a rotary mold, a trough having a discharge through which the material is fed into the mold, means to mount the trough for movement into and out of the mold, controlling means for the discharge, means engaging the controlling means to effect movement thereof to open the discharge, and means to selectively connect the controlling means to the trough so that upon movement of the controlling means the trough will be moved into and out of the mold.

19. In a centrifugal plastic ware making machine, a rotary mold, rotary means upon which the mold is rotatably supported so as to be rotated by and upon rotary movement of the mold, a trough for discharging the material into the mold, feeding means in the trough, driving means for the mold, and means actuated by the rotation of the rotary mold supporting means to operate the feeding means.

20. In a centrifugal plastic ware making machine, a pair of spaced rotary molds, rotary members supporting the molds, driving means for the molds including a rotary driving member engaged with the upper arcs of the molds and exerting downward pressure thereon so as to positively hold the molds against upward movement, and means to move the driving means into and out of engagement with the molds.

21. In a plastic ware making machine, a mold, heads, means to detachably connect the heads to the ends of the mold, and connections carried by one of the heads for admitting steam and water into the head, one of the heads having an outlet for the steam and water.

22. The hereindescribed process of making hollow ware which consists in rotating a quantity of plastic material against a conforming surface, and then in curing the product by internal injection of steam and water into the product.

23. The hereindescribed process of making hollow ware which consists in forming the ware into hollow form and then in rotating a quantity of plastic material against a conforming surface, and then in curing the product by internal injection of steam and water into the product.

24. The hereindescribed process of making hollow ware which consists in rotating a quantity of plastic material against a confining surface coated with fusible material, and then in internally injecting steam and water into the product to cure the latter and to melt the fusible material to allow the product to be removed.

In testimony whereof I have signed my name to this specification.

CLIFFORD R. NICHOLS.